United States Patent [19]

Lapeyre

[11] 4,153,152

[45] May 8, 1979

[54] BI-DIRECTIONAL HINGED CONVEYOR BELT

[75] Inventor: James M. Lapeyre, New Orleans, La.

[73] Assignee: The Laitram Corporation, New Orleans, La.

[21] Appl. No.: 768,531

[22] Filed: Feb. 14, 1977

[51] Int. Cl.² ............................................. B65G 17/06
[52] U.S. Cl. .................................... 198/851; 198/831; 198/834; 198/852
[58] Field of Search ................ 198/321, 844, 850–853, 198/831, 778, 793, 834, 325, 637, 635; 74/245 R, 245 C, 245 LP, 245 P, 250 R, 250 C

[56] References Cited

U.S. PATENT DOCUMENTS

| | | | |
|---|---|---|---|
| 1,191,434 | 7/1916 | Keith | 198/852 |
| 1,824,858 | 9/1931 | Williams | 198/844 |
| 2,141,876 | 12/1938 | Perkins | 198/852 |
| 2,704,943 | 3/1955 | Harris | 198/852 |
| 3,285,394 | 11/1966 | Lanham et al. | 198/851 |
| 3,554,360 | 1/1971 | Bildsoe | 198/793 |
| 3,685,637 | 8/1972 | Bildsoe | 198/850 |
| 3,730,331 | 5/1973 | Goldberg | 198/850 |
| 3,865,229 | 2/1975 | Velander | 198/850 |
| 4,051,949 | 10/1977 | Lapeyre | 198/853 |

Primary Examiner—Joseph E. Valenza
Attorney, Agent, or Firm—Weingarten, Maxham & Schurgin

[57] ABSTRACT

A conveyor composed of a plurality of identical interconnected modular links and movable through straight and multiply curved travel paths. Each link is pivotally connected to adjacent links for relative pivotal movement about a first axis. Each modular link is composed of two sections which are pivotally joined for relative pivotal movement of the sections about a second axis orthogonal to the first axis. Sprocket teeth are integrally formed with the modular links along for cooperation with vertical or horizontal sprocket wheels for transport of the conveyor in either plane. The upper surface of the modular links defines a conveying surface and may include a spaced array of upstanding ribs.

23 Claims, 18 Drawing Figures

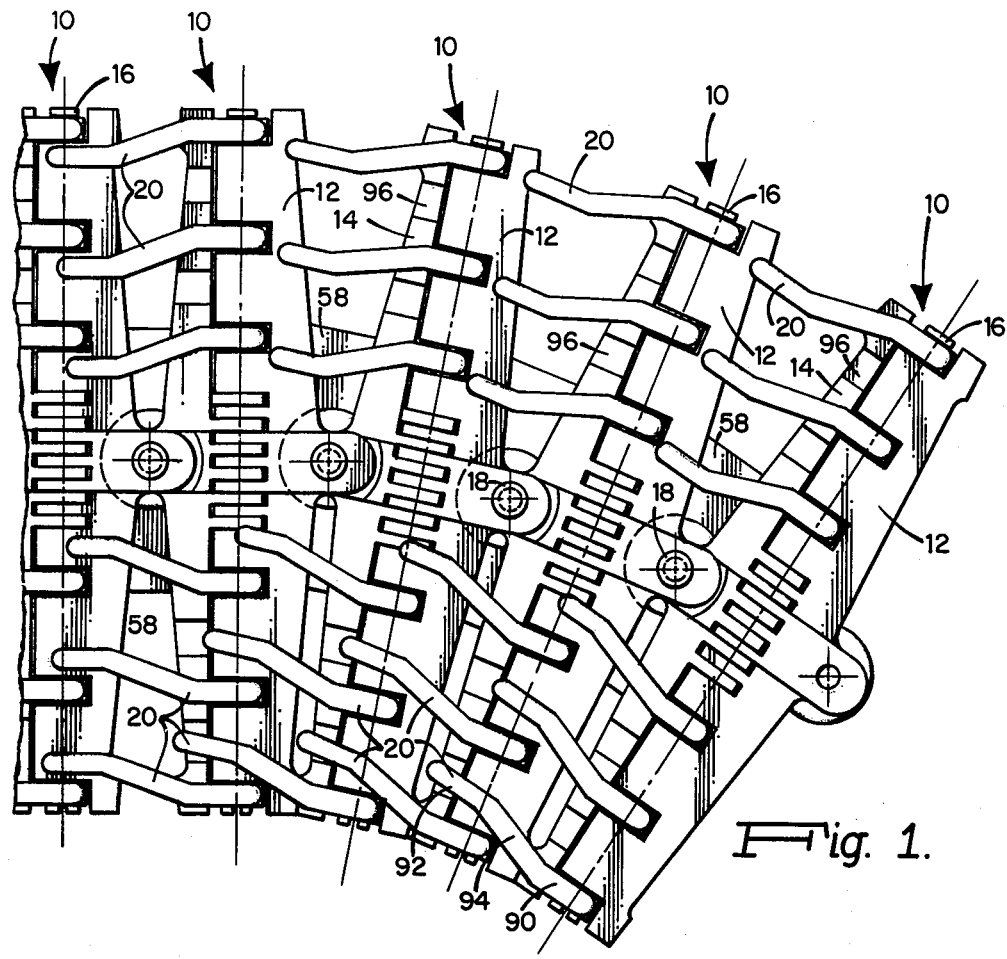
Fig. 1.
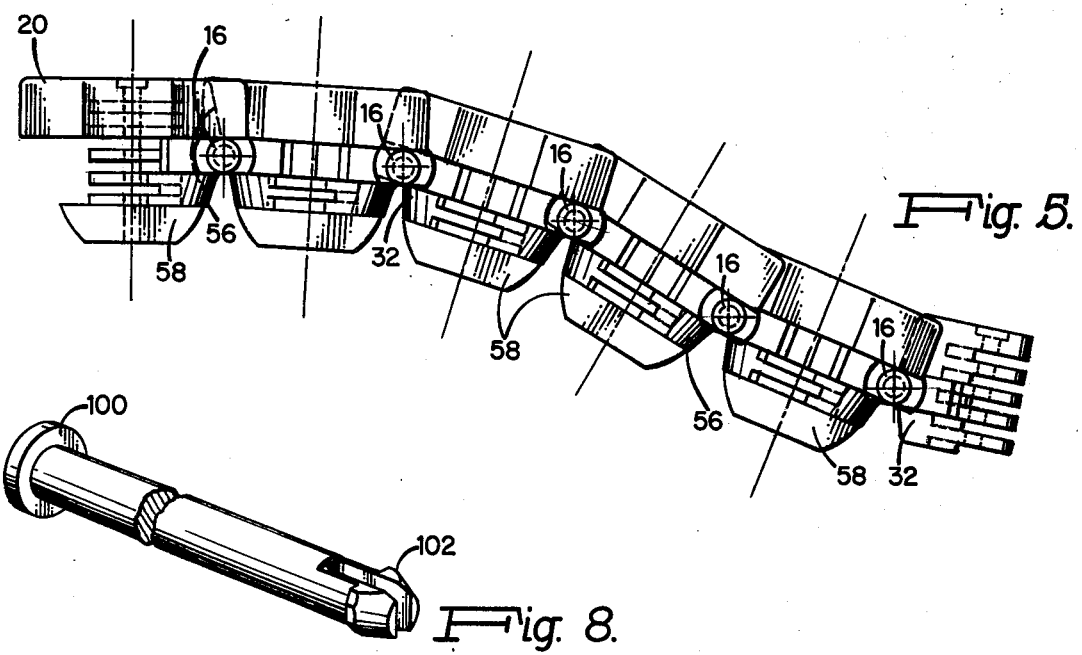
Fig. 5.
Fig. 8.

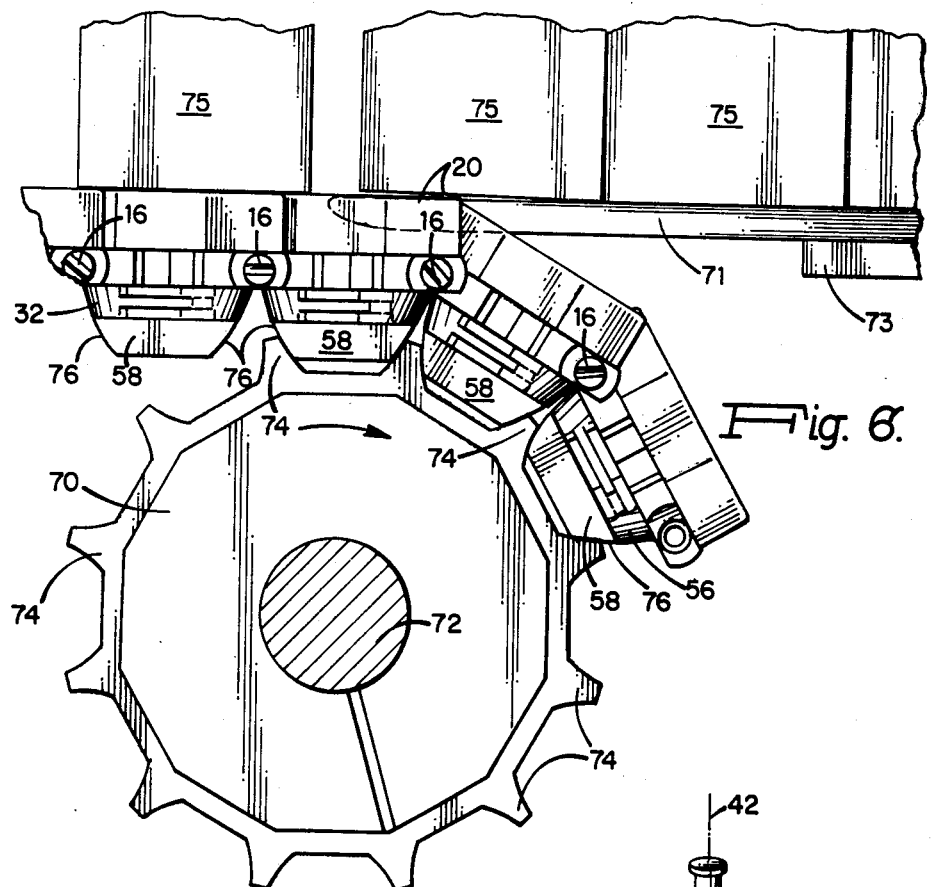

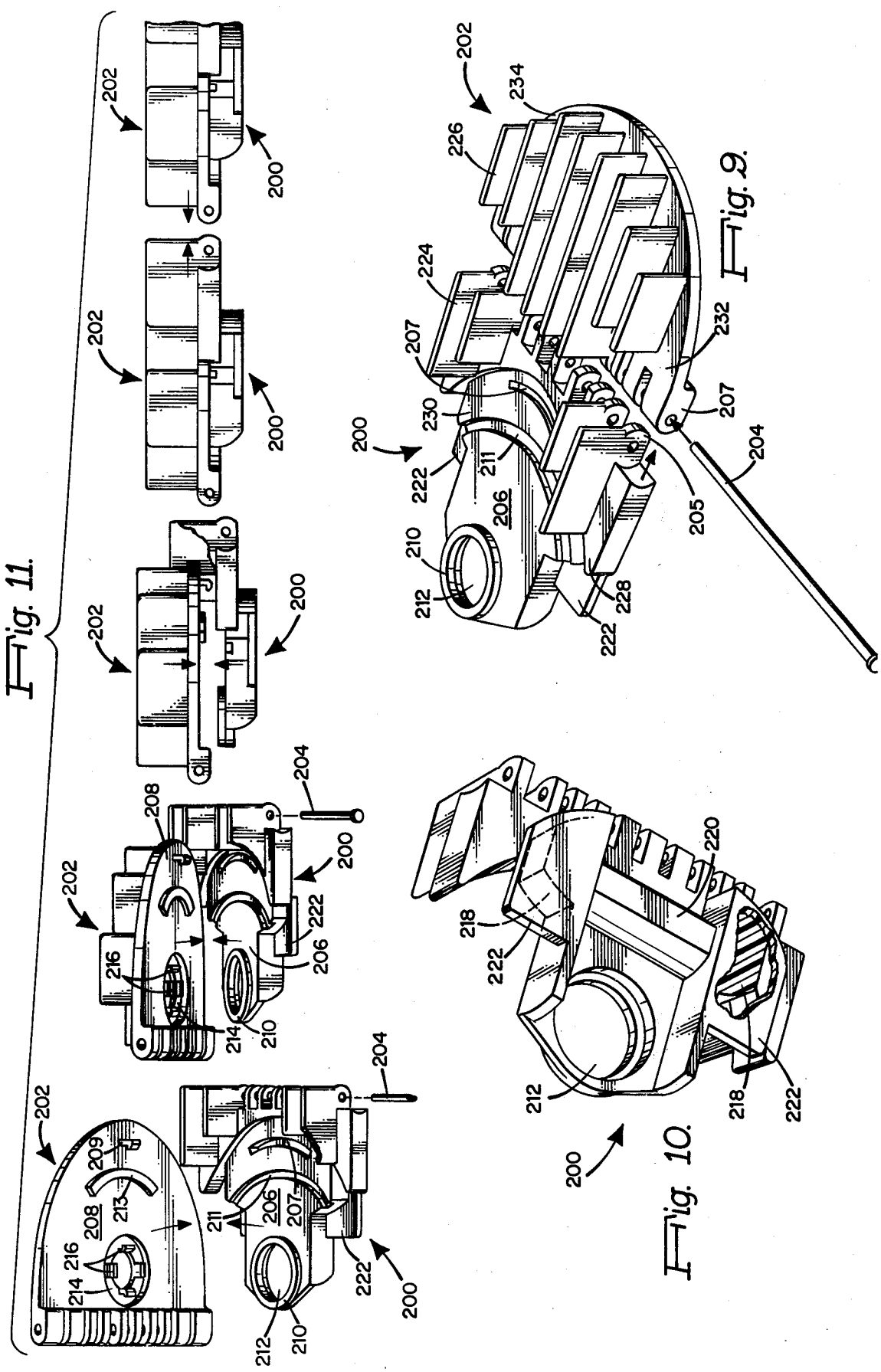

BI-DIRECTIONAL HINGED CONVEYOR BELT

FIELD OF THE INVENTION

This invention relates to conveyors and more particularly to a multiple link conveyor capable of movement along straight or curved paths.

BACKGROUND OF THE INVENTION

Conveyors formed of interconnected links are well known and have been constructed in many different forms to provide movement along an intended path. One type of known conveyor, as shown for example in U.S. Pat. Nos. 3,144,124 and 3,706,200, employs a plurality of links having knuckles interconnected by pivot pins to provide relative movement of the links in a normally vertical plane transverse to the conveyor plane. Another type of multiple link conveyor, known as a laterally flexible or sideflexing conveyor, is shown in U.S. Pat. Nos. 3,512,627 and 3,776,349, composed of links interconnected by pivot pins, each pin being disposed through a knuckle joint with an enlarged opening to permit lateral angular movement of the links, as well as pivotal movement of the links aout the pivot pin axis. A further conveyor structure is shown in U.S. Pat. No. 3,768,631 and which is composed of a series of molded plastic links each having a head portion which is coupled to a bifurcated leg portion of an adjacent link and hinged thereto by a pivot pin extending laterally through the links. The opening through the head portion in which the pivot pin is disposed is configured to permit angular movement of adjacent links in the conveyor plate as well as angular movement of adjacent links about the pivot pin axis. A further conveyor structure is the subject of U.S. Pat. No. 3,777,877 in which an array of palates are linked to underlying support plates by means of normally vertical pivots to provide for relative movement between palates and the support members about a normally vertical axis, the support members being hinged about a normally horizontal axis to permit banking of the conveyor. A further conveyor type employs a ball and socket interconnection for the links, examples being shown in U.S. Pat. Nos. 3,344,905 and 3,370,331.

SUMMARY OF THE INVENTION

In brief, the present invention provides a conveyor comprising a plurality of identical interconnected modular links and capable of movement through straight and multiply curved travel paths. The conveyor is operative to be moved in a curved path in the conveyor plane and in a curved path in a plane transverse to the conveyor plate. Each link of the conveyor serves as an identical modular unit which includes linking ends pivotally connected to the linking ends of adjacent links for relative pivotal movement of adjacent links about a first axis. Each modular link is composed of two sections which are pivotally joined at a position intermediate the linking ends for relative pivotal movement of the sections about a second axis orthogonal to the first axis. Thus, the link sections are relatively pivotable in a first plane while the adjacent links are relatively pivotable in an orthogonal plane, and a conveyor composed of these interconnected links is therefore bidirectionally movable to provide versatile transport along various intended paths.

In one embodiment of the invention, the link sections are pivotally joined for relative movement therebetween about a normally horizontal axis, while adjacent links are pivotally joined for relative movement about a normally vertical axis. In another embodiment the link sections are pivotally joined for relative movement about a normally vertical axis, the adjacent links being pivotally joined for relative movement about a normally horizontal axis. Sprocket teeth are integrally formed with the modular links for cooperation with vertical or horizontal sprocket wheels for transport of the conveyor in either plane. A vertically disposed sprocket tooth of each modular link is disposed intermediate a pair of horizontal pivots, while a horizontally disposed sprocket tooth of each link is disposed intermediate a pair of vertical pivots.

The modular links may include a spaced array of upstanding ribs the upper surface of which defines a conveying surface. The rib array of each link can be in meshed interdigitated relationship to a like array of ribs on adjacent links to provide an effectively continuous flat conveying surface even during movement of the conveyor through a curved path in the conveyor plane. The links are preferably molded of a high strength plastic material, while the interconnecting pins pivotally joining the links and link sections can also be of the same or a compatible plastic material.

DESCRIPTION OF THE DRAWINGS

The invention will be more fully understood from the following detailed description taken in conjunction with the accompanying drawings in which:

FIG. 1 is a top view of a conveyor according to the invention;

FIG. 2 is a cutaway exploded pictorial view of the link sections according to the invention;

FIG. 5 is an elevation view of the interconnected links;

FIG. 6 is an elevation view illustrating the cooperation of the novel conveyor with a vertical sprocket wheel;

FIG. 8 is a pictorial view of a pivot pin useful in the novel conveyor;

FIG. 9 is an exploded pictorial view of a link section of an alternative embodiment of the invention;

FIG. 10 is a bottom pictorial view of one of the link sections of FIG. 9;

FIG. 11 is an exploded partially pictorial and partially elevation view of the alternative embodiment of FIG. 9;

DETAILED DESCRIPTION OF THE INVENTION

Figure 4:
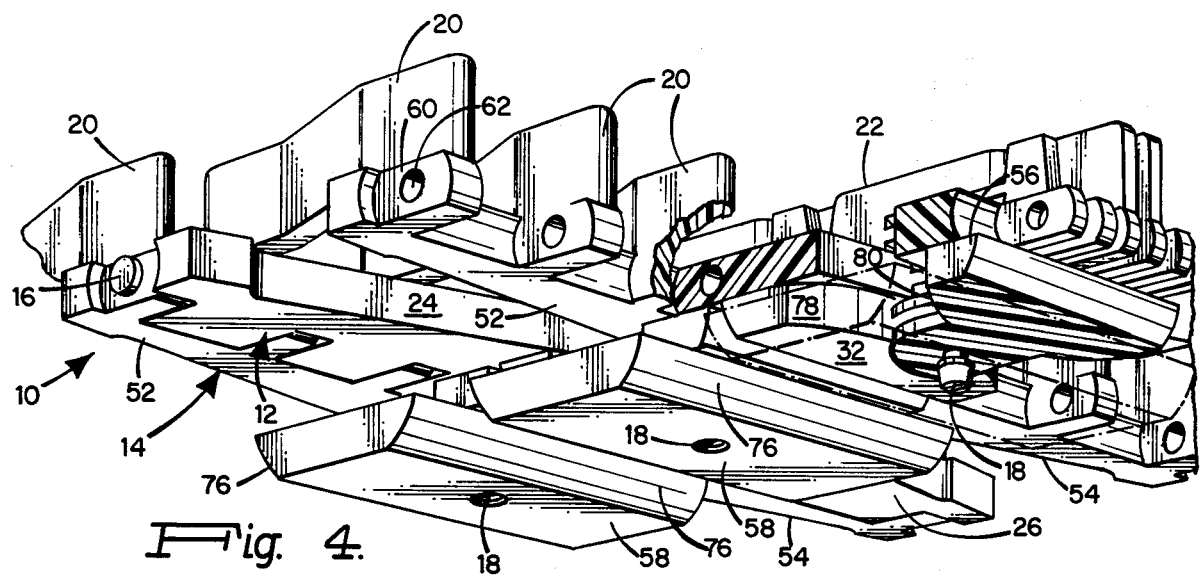
FIG. 4 is a cutaway pictorial view of the interconnected link sections.
Figure 3:
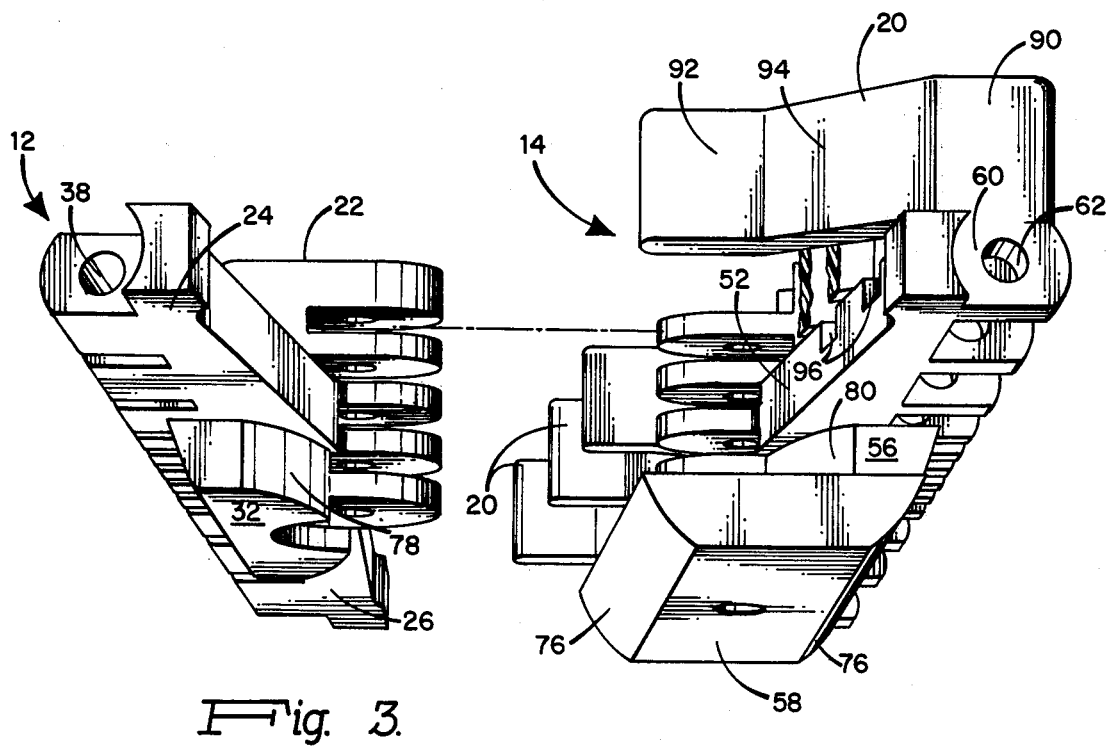
FIG. 3 is an exploded pictorial view of the link sections of FIG. 2.

Referring to FIG. 1, there is shown a plan view of the cooperative links of the novel conveyor which are pivoted about two mutually orthogonal axes to provide conveyor movement in a curved path within the plane of the conveyor and within planes transverse to the conveying plane. The interconnected links are each shown generally at 10 and are each composed of two sections 12 and 14 hinged for pivotal movement about a pin 16. Normally, the links 10 of the conveyor are horizontally disposed for conveying purposes and for convenience pin 16 will be referred to as the horizontal pin while pin 18 will be referred to as the vertical pin. An array of spaced ribs 20 are provided along each link 10 and are upstanding therefrom to define a conveying surface. These ribs 20 are cooperative with like arrays of ribs on adjacent links 10 such that the ribs remain substantially in interdigitated meshing relationship during curved movement of the conveyor in the conveying plane thereby to provide an effectively continuous conveying surface without gaps in the conveying surface between the links through which articles can fall or beome lodged. The sections 12 and 14 of links 10 are preferably molded of a high strength plastic material. The pivot pins 16 and 18 can be of the same material. The hinged portions of the interconnected links are of a construction to be described providing substantial strength while permitting intended pivotal movement.

The construction of cooperative link sections 12 and 14 are shown more particularly in FIGS. 2–5. Section 12 includes a central linking portion 22 and outwardly extending arms 24 and 26 oppositely extending from linking portion 22 and lying along a first axis 28 about which sections 12 and 14 are pivotable and which axis is transverse to the conveyor axis 30 about which sections 12 and 14 are symmetrically disposed. A horizontal sprocket plate 32 is disposed below arms 24 and 26 and is cooperative with a similar sprocket plate on section 14 to mate with a horizontally disposed sprocket wheel for driving of the links in a plane parallel to the plane of the sprocket wheel and conveying surface, usually a horizontal plane. Linking portion 22 includes a plurality of spaced parallel fingers 34 extending along axis 28 and cooperative with similar spaced fingers on section 14.

Arms 24 and 26 include along the side confronting section 14 a plurality of notches 36 which are cooperative with mating portions of the confronting side of section 14. Openings 38 are provided in fingers 34 and the notched side of arms 24 and 26 to define an opening aligned with axis 28 and for receiving a horizontal pin 16 for the pivotable interconnection of sections 12 and 14. Linking portion 22 also includes a plurality of spaced parallel plates 40 extending along a second axis 42 which is orthogonal to conveyor axis 30 and first axis 28. The spaced plates 40 are cooperative with a similar array of space plates of section 14 of an adjacent link to provide pivotable movement about the second axis 42, normally the vertical axis. An opening 44 is provided through plates 40 of linking portion 22 aligned with axis 42 and adapted for receiving a vertical pivot pin 18 about which adjacent links 10 are movable.

Section 14 also includes a central linking portion 50 and outwardly extending arms 52 and 54 which in turn support a plurality of spaced raised ribs 20, the upper surfaces of which define the conveyor surface. A horizontal sprocket plate 56 is disposed below arms 52 and 54 and cooperative with sprocket plate 32 of section 12 as described above. A vertical sprocket plate 58 is disposed below horizontal sprocket plate 56 and is cooperative with a vertically disposed sprocket wheel to provide movement of the links 10 along conveyor axis 30. Arms 52 and 54 include a plurality of spaced flanges 60 cooperative with respective notches 36 of arms 24 and 26 of section 12 and including openings 62 for accommodation of horizontal pin 16. The linking portion 50 includes a plurality of spaced parallel fingers 64 extending along axis 28 and constructed for meshing relationship with fingers 34 of section 12. Openings are also provided through fingers 64 for receipt of pivot pint 16. The linking portion 50 also includes a plurality of spaced parallel plates 65 extending along the vertical axis 42 and cooperative with the spaced plates 40 of section 12 of the adjacent link 10. An opening 66 is provided through plates 65 and through which vertical pin 18 is disposed with plates 65 in mesh with plates 40 of the adjacent link 10.

It will be appreciated that each section 12 and 14 of each link 10 includes a linking end for pivotal cooperation with an adjacent member. Thus, for section 14, plates 65 are part of a first linking end, while fingers 64 are part of a second linking end. For section 12, fingers 34 are prt of a third linking end, while plates 40 are part of a fourth linking end.

Each of the link sections 12 and 14 are of integral construction, preferably molded of high strength plastic material. The pivot pins 16 and 18 are also preferably of plastic material and can be as shown in FIG. 8 having head 100 and a latching end portion 102 for retention of the pin in the links. The link sections are pivotable about the horizontal axis while adjacent links are pivotable about the vertical axis such that the conveyor formed of interconnected links can be transported through a path which can include curves in the horizontal and vertical planes as well as providing movement along inclined planes. Thus, the construction of the novel conveyor provides extremely versatile operation employing conveyor links of a single standardized form. There is by virtue of the invention no necessity for employing different conveyors for different conveyor movements, such as one type of conveyor for movement through curves in a horizontal plane and another type for movement through curves in a horizontal plane.

The movement of the conveyor in a circular path in the vertical plane is shown in FIG. 6. A vertically disposed sprocket wheel 70 is rotatable about a horizontal axle 72 and includes sprocket teeth 74 which mesh with the forward and rearward surfaces of sprocket plates 58. More particularly, each sprocket plate 58 includes forward and rearward surfaces 76 which are of curved configuration to mate with the confronting surfaces of sprocket teeth 74. Each sprocket plate 58 is dimensioned and configured between the forward and rearward surfaces 76 for disposition between adjacent teeth 74 of wheel 70 and serves as a cog or meshing gear tooth by which the conveyor is transported through a curved path.

A transfer plate of comb-like configuration can be disposed in association with the conveyor as it moves around sprocket wheel 70. A shown in FIG. 6, the transfer plate includes a support member 73 having a spaced array of parallel fingers 71 which extend between the array of ribs 20. The upper surfaces of fingers 71 lie in or just below the plane of the upper surfaces of ribs 20 when in a straight path. As the conveyor curves downward, a product 75 is smoothly transferred onto fingers 71 for removal from the conveyor. There is no gap between the conveyor and the transfer plate which could cause tipping or jamming of the product during transfer off of the conveyor.

Figure 7:
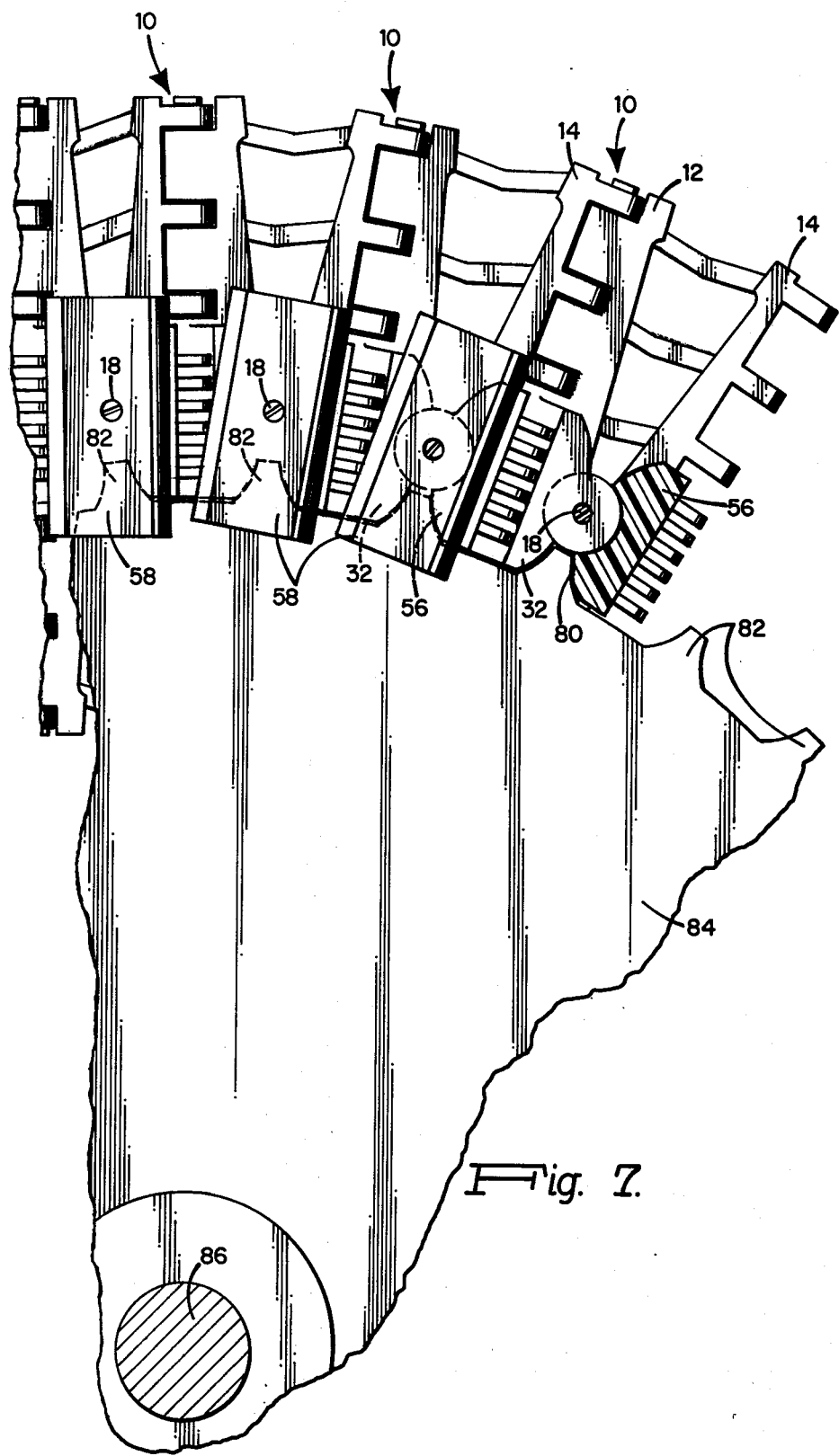
FIG. 7 is a sectional bottom view illustrating the cooperation of the novel conveyor with a horizontal sprocket wheel.

Movement of the conveyor in a circular path in the horizontal plane is depicted in FIG. 7. The sprocket plate 32 of a section 12 and the sprocket plate 56 of a section 14 of an adjacent link have respective confronting curved surfaces 78 and 80 which are cooperative with a tooth 82 of a horizontally disposed sprocket wheel 84 which is rotatable about an axle 86. The plates 32 and 56 of the same link 10 are configured to be disposed between adjacent teeth 82 of wheel 84 and in gear meshing engagement therewith. Thus, the plates 32 and 56 provide a multiple tooth configuration which is adapted to mesh with the sprocket teeth 82 of wheel 84. It will be appreciated that the specific configuration of the meshing surfaces of plates 32, 56 and 58 can be of different known gear tooth forms to provide intended meshing relationship with the associated sprocket wheel.

A substantially continuous conveyor surface is provided by the interdigitated meshed ribs 20 of the interconnected links 10. Referring particularly to FIGS. 1 and 2, the ribs 20 are affixed to arms 52 and 54 of section 14 of each link and are disposed in a spaced array along axis 28 across the full width of link section 14. The ribs 20 are each of skewed configuration having end portions 90 and 92 parallel to one another and orthogonal to axis 28 of the associated link, and joined by an intermediate diagonally disposed portion 94. The ribs on each arm of an associated link are in a parallel array skewed toward the central linking portion of the associated link. The end portions 92 of ribs 20 are disposed intermediate the end portions 90 of the ribs of an adjacent link to provide a meshed interdigitated array. Even during movement of the links in a horizontal plane, the ribs 20 remain substantially in mesh to provide an effectively continuous conveying surface.

The link sections 14 each include a spaced array of ramps 96 which slope downwardly toward the edge of arms 24 and 26. These ramps provide clearance for rib portions 92 of an adjacent link when adjacent links are disposed in a compound curve configuration, such as with adjacent links pivoted about pin 18 toward one another and with section 14 pivoted about pin 16 upward toward the conveying surface.

An alternative embodiment is shown in FIGS. 9-12 and includes sections 200 and 202 hinged for pivotal movement about a horizontal axis defined by pin 204 extending through the meshing fingers 205 and 207 of the respective sections. Section 200 includes a portion 206 cooperative with the portion 208 of section 202 to provide pivotal movement about a vertical axis defined by a rotatable coupling. The coupling includes an annular ring 210 upstanding from the surface of portion 206 at an end thereof and having an opening 212 therethrough. Portion 208 of section 202 includes a recess 214 into which ring 210 is rotatably disposed, and a plurality of retaining elements 216 which extend through opening 212 and detent under the bottom surface of ring 210 to retain sections 200 and 202 in rotatable engagement. A circular groove 207 can be provided in an upper surface of section 200 lying along the rotational axis of the coupling formed by ring 210 and retaining elements 216. A detent element 209 extending from the bottom surface of section 202 is operative upon assembly of link sections 200 and 202 to be retained under a lip of groove 207 to provide additional rotatable fastening of the two link sections. A second circular groove 211 is provided in an upper surface of section 200 concentric with groove 207 and cooperative with a circular ridge 213 disposed from the bottom surface of section 202. The ridge 213 is movable within associated groove 211 during pivotal movement of sections 200 and 202 and provides further shear strength along the conveyor axis.

Figure 13:
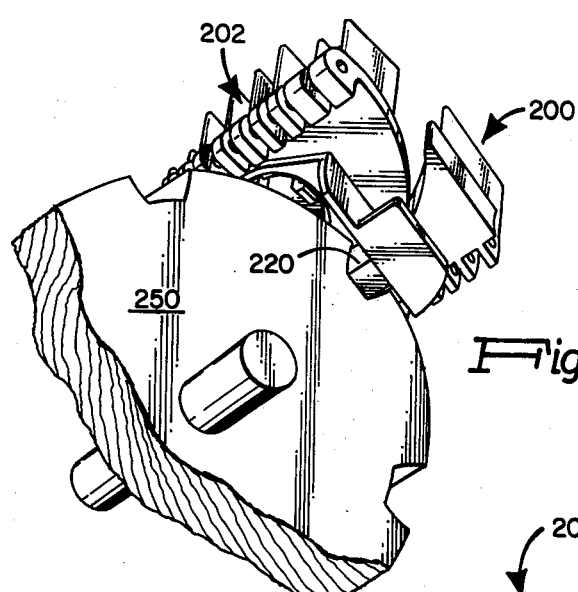
FIGS. 13 and 14 are bottom pictorial views illustrating the cooperation of the alternative embodiment with a vertical and a horizontal sprocket wheel respectively.
Figure 14:
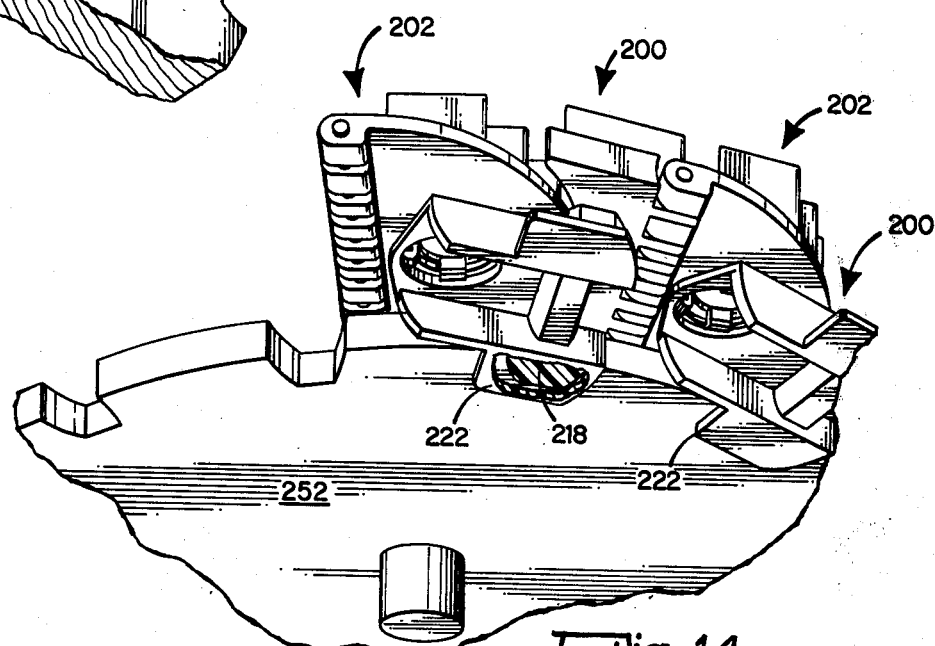

A sprocket tooth 218 is provided on each side of section 200 for engagement with a horizontal sprocket for driving a conveyor in a horizontal plane. A vertical sprocket tooth 220 is also provided on section 200 for engagement with a vertical sprocket. Tabs 222 outwardly extend from each side of section 200 for cooperation with guides (not shown) which are part of the conveyor transport apparatus to maintain the disposition without tipping of the conveyor links along the travel path. The horizontal sprocket teeth 218 are disposed intermediate the horizontal axes of pivot pins 204, while the vertical sprocket tooth 220 is disposed intermediate the vertical axes of the rotatable coupling. Cooperation of a vertical sprocket wheel 250 with tooth 220 is shown in FIG. 13. Meshing of a horizontal sprocket wheel 252 with tooth 218 is depicted in FIG. 14. It is evident that the links can be driven in either the vertical or horizontal lane to provide corresponding movement of the conveyor, as described.

Figure 12:
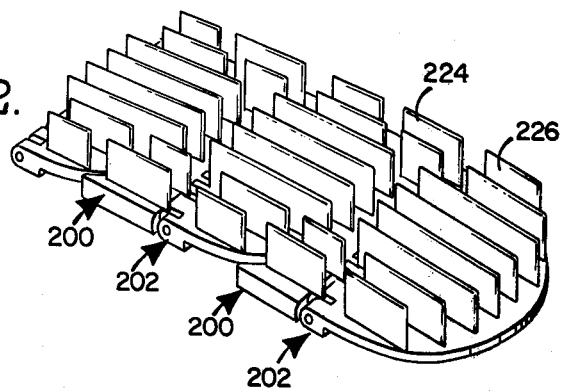
FIG. 12 is a pictorial view of the alternative embodiment showing the links interconnected.
Figure 16:
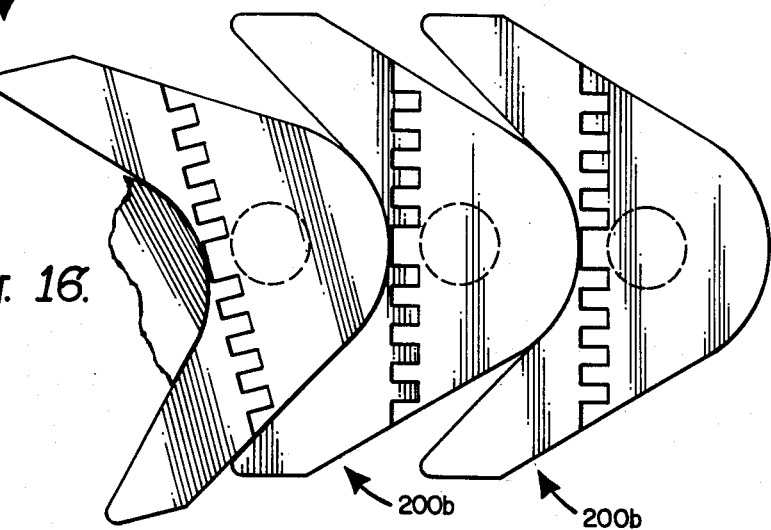
Figure 17:
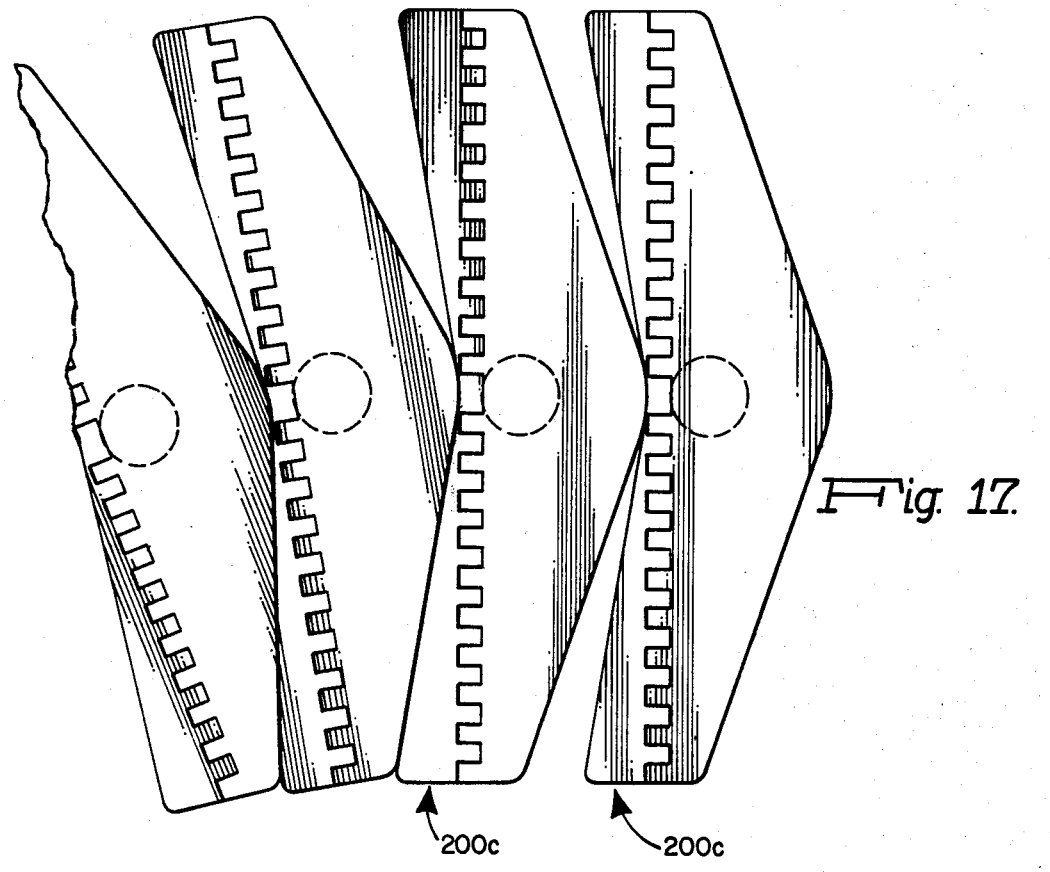

A plurality of upstanding ribs 224 are provided on section 200 and a plurality of upstanding ribs 226 are provided on section 202, these ribs being cooperative to define a conveying surface at the upper surfaces thereof. As best seen in FIG. 12, the ribs 224 are spaced from the aligned ribs 226 by an amount sufficient to permit relative movement of sections 200 and 202 about a horizontal axis without interference of the ribs. The ribs are also of a length to not interfere with relative rotation between the link sections about the vertical axis. It will be appreciated that ribs 224 and 226 need not be employed and for some applications it is desirable to provide a conveying surface directly on the upper surfaces of the link sections 200 and 202, as in FIGS. 15-17.

Figure 15:
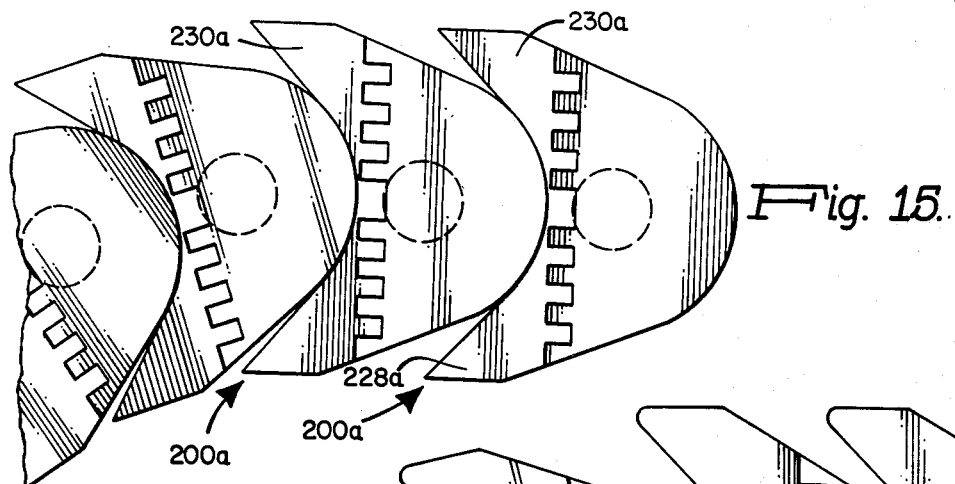
FIG. 15-17 are plan views of variations of the embodiment of FIG. 9 illustraing successively flared side portions of the modular link.

The portions 228 and 230 of section 200 are flared at a greater angle than the flare of the side portions 232 and 234 of section 202 of an adjacent link such that the links are rotatable about the vertical axis to a predetermined extent. This side portions 228 and 230 of section 200 can extend outwardly by an amount to provide an intended conveyor width. As shown in FIG. 15, section 200a includes side portions 228a and 230a flared outwardly to a greater extent than in the embodiment of FIGS. 9-14. Still further extended side portions of link sections 200b and 200c are illustrated in respective FIGS. 16-17.

Figure 18:
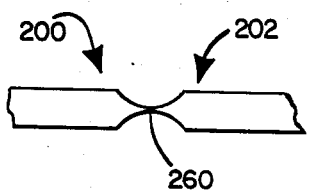
FIG. 18 is a diagrammatic elevation view of interconnected link sections pivotally joined by an integral hinge.

In place of a pivot pin, a flex joint can be provided by a thinned section of plastic formed with the links to serve as an integral hinge. As shown in FIG. 18, link sections 200 and 202, illustrated diagrammatically, are hinged by an integral portion 260 of reduced thickness to be flexible about a horizontal axis.

It will be appreciated that various other modifications and alternative implementations of the invention will now occur to those versed in the art without departing from the spirit and true scope of the invention. Accordingly, the invention is not to be limited by what has been shown and described except as indicated in the appended claims.

What is claimed is:

1. A bi-directionally movable multiple link conveyor comprising:
   a plurality of modular links each having:
   a first integral central linking portion terminating in first and second linking ends disposed along a conveyor axis;
   a second integral central linking portion terminating in third and fourth linking ends disposed along said conveyor axis;
   first and second arms extending outwardly along a first axis transverse to said conveyor axis and being integrally formed with said first linking portion;
   third and fourth arms extending outwardly along said first axis and being integrally formed with said second linking portion;
   a plurality of spaced ribs defining a conveyor surface and attached to only said third and fourth arms of each modular link and being transversley disposed thereon and upstanding therefrom and outwardly extending from the sides thereof substantially along said conveyor axis; and
   said second linking end of said first linking portion being pivotally coupled to said third linking end of said second linking portion for pivotal movement of said first and second linking portions about said first axis;
   said first linking end of each of said links being pivotally coupled to said fourth linking end of an adjacent link for pivotal movement about a second axis orthogonal to said conveyor axis and said first axis.

2. A bi-directionally movable multiple link conveyor according to claim 1 wherein said second and third linking ends each include:
   a plurality of spaced planar fingers outwardly extending along said conveyor axis, each of said fingers of said second linking ends disposed in offset meshed relationship with each of said adjacent fingers of said third linking ends to provide pivotal movement about said first axis.

3. A bi-directionally movable multiple link conveyor according to claim 2 wherein said fingers of said second and third linking ends each have a longitudinal hole along said first axis and further including a pivotal pin disposed along said first axis and through each of said longitudinal holes to provide secured pivotal support for movement about said first axis.

4. A bi-directionally movable multiple link conveyor according to claim 1 wherein at least one of said first and second arms include a plurality of spaced planar fingers outwardly extending along said conveyor axis and wherein at least one of said third and fourth arms include a plurality of spaced fingers outwardly extending along said conveyor axis;
   the spaced planar fingers of said at least one of said first and second arms being disposed in offset meshed relationship with the spaced planar fingers of said at least one of said third and fourth adjacent arms to provide pivotal movement about said first axis.

5. A bi-directionally movable conveyor according to claim 4 wherein said fingers of said at least one of said first and second arms and wherein said fingers of said at least one of said third and fourth arms each have a longitudinal hole along said first axis; and
   further including a pivotal pin disposed along said first axis and through each of said longitudinal holes to provide secured pivotal support about said first axis.

6. A bi-directionally movable conveyor according to claim 1 wherein said first linking ends of each of said modules include a plurality of spaced parallel plates outwardly extending along said conveyor axis; and
   further wherein said fourth linking end of each of said modules include a plurality of spaced plates outwardly extending along said conveyor axis; and
   said plates of said first linking ends of each of said modules disposed in offset meshed relationship with adjacent plates of said fourth linking ends of each of said adjacent modules for pivotal movement about said second axis.

7. A bi-directionally movable conveyor according to claim 6 wherein each of said plates of each module has a hole along said second axis; and
   further including a pivot pin disposed along said second axis and through each of said hole to provide secured pivotal support for movement about said second axis.

8. A bi-directionally movable conveyor according to claim 1 wherein each of said second integral central linking portions includes:
   a first sprocket plate disposed along said conveyor axis and below and integral with said second integral central linking portion;
   said first sprocket plate having first and second sprocket contact surfaces to said conveyor axis; and
   said first sprocket contact surface of each of said modules disposed in confronting spaced relation to said second sprocket contact surface of each of adjacent modules to define a predetermined sprocket aperture therebetween adapted to mesh with a sprocket wheel rotating in a plane perpendicular to said conveyor axis.

9. A bi-directionally movable conveyor according to claim 1 wherein:
   each of said first integral central linking portions includes a second sprocket plate disposed along said conveyor axis below and integral with said first linking portion;
   said second sprocket plate having a first sprocket support surface symmetrical about said conveyor axis and extending outwardly therefrom along said first axis, said support surface terminating in first and second sprocket support ends;
   each of said second integral central linking portions includes a third sprocket plate disposed along said conveyor axis and intermediate said first sprocket plate and said second integral central linking portion;
   said third sprocket plate having a first sprocket support surface symmetrical about said conveyor axis and extending outwardly therefrom along said first axis, said surface terminating in third and fourth sprocket support ends;
   said first sprocket support ends of said second sprocket plate disposed in confronting spaced relation to adjacent third sprocket support ends of said third sprocket plate to define therebetween a predetermined sprocket aperture, said aperture adapted for reception of a sprocket tooth rotatable in a plane parallel to said conveying surface;

said second sprocket support ends of said second sprocket plate disposed in confronting spaced relation to adjacent fourth sprocket support ends of said third sprocket plate to define therebetween a predetermined sprocket aperture, said aperture adapted to mesh with a sprocket wheel rotatable in a plane parallel to said conveying surface.

10. A bi-directionally movable multiple link conveyor according to claim 1 further including a transfer plate of comb-like configuration having spaced fingers lying substantially in the conveyor plane and disposed in interdigitated relation to said ribs such that as the conveyor moves downward from the conveyor plane, a product is smoothly transferred onto the fingers of said transfer plate.

11. A bi-directionally movable multiple link conveyor comprising:
a plurality of modular links each having:
a first integral central linking portion terminating in first and second linking ends disposed along a conveyor axis;
a second integral central linking portion terminating in third and fourth linking ends disposed along said conveyor axis;
first and second arms extending outwardly along a first axis transverse to said conveyor axis and being integrally formed with said first linking portion;
third and fourth arms extending outwardly along said first axis and being integrally formed with said second linking portion;
a plurality of spaced ribs defining a conveyor surface and attached to the arms of only one of said central linking portions of each modular link and being transversely disposed thereon and upstanding therefrom and outwardly extending from the sides thereof substantially along said conveyor axis; and
said second linking end of said first linking portion being pivotally coupled to said third linking end of said second linking portion for pivotal movement of said first and second linking portions about said first axis;
said first linking end of each of said links being pivotally coupled to said fourth linking end of an adjacent link for pivotal movement about a second axis orthogonal to said conveyor axis and said first axis.

12. A bi-directionally movable conveyor according to claim 11 wherein each of said second integral central linking portions includes:
a first sprocket plate disposed along said conveyor axis and below and integral with said second integral central linking portion;
said first sprocket plate having a pair of spaced sprocket contact surfaces transverse to said conveyor axis; and
said first sprocket contact surface of each of said modules disposed in confronting spaced relation to said second sprocket contact surface of each of adjacent modules to define a predetermined sprocket aperture therebetween adapted to mesh with a sprocket wheel rotating in a plane perpendicular to said conveyor axis.

13. A bi-directionally movable conveyor according to claim 11 wherein:
each of said first integral central linking portions includes a second sprocket plate disposed along said conveyor axis below and integral with said first linking portion;

said second sprocket plate having a first sprocket support surface symmetrical about said conveyor axis and extending outwardly therefrom along said first axis, said support surface terminating in a first sprocket support end;
each of said second integral central linking portions includes a third sprocket plate disposed along said conveyor axis and intermediate said first sprocket plate and said second integral central linking portion;
said third sprocket plate having a first sprocket support surface symmetrical about said conveyor axis and extending outwardly therefrom along said first axis, said surface terminating in a second sprocket support end;
said first sprocket support ends of said second sprocket plate disposed in confronting spaced relation to adjacent second sprocket support ends of said third sprocket plate to define therebetween a predetermined sprocket aperture, said aperture adapted to mesh with a sprocket wheel rotatable in a plane parallel to said conveying surface.

14. A bi-directionally movable multiple link conveyor according to claim 1 wherein adjacent modular links have a gap therebetween extending parallel to the conveyor plane;
the ribs of each modular link extending across said gap in interdigitated relation to the ribs of the adjacent modular link to provide a substantially continuous conveyor surface.

15. A bi-directionally movable multiple link conveyor according to claim 1 wherein each modular link includes:
a first sprocket element integral with said link at a position intermediate said first and second linking ends and extending along an axis parallel to said first axis;
a second sprocket element integral with said link at a position intermediate the adjacent first axes of adjacent links and extending along an axis parallel to said second axis.

16. A bi-directionally movable multiple link conveyor according to claim 1 wherein each modular link includes first integral sprocket means on at least one of said linking portions and outwardly extending opposite to said conveyor surface and operative to mesh with a sprocket wheel rotatable about an axis parallel to said conveyor surface.

17. A bi-directionally movable multiple link conveyor according to claim 1 wherein each modular link includes second integral sprocket means on at least one of said linking portions and outwardly extending from at least one side of said linking portions in a plane parallel to said conveyor surface and operative to mesh with a sprocket wheel rotatable about an axis orthogonal to said conveyor surface.

18. A bi-directionally movable multiple link conveyor according to claim 1 wherein said ribs each include end portions generally parallel to one another and spaced along said first axis, and an intermediate portion diagonally disposed and joining said rib end portions.

19. A bi-directionally movable multiple link conveyor according to claim 1 wherein said third and fourth arms include clearance ramps between the ribs on said third and fourth arms to provide clearance for the rib end portions of an adjacent link.

20. A bi-directionally movable multiple link conveyor according to claim 11 wherein the end portions of the ribs of a link are disposed intermediate the end portions of the ribs of an adjacent link to provide a meshed interdigitated rib array.

21. A bi-directionally movable multiple link conveyor according to claim 11 wherein said ribs are integral with the arms on which they are disposed.

22. A bi-directionally movable multiple link conveyor comprising:
a plurality of modular links each having:
a first integral central linking portion terminating in first and second linking ends disposed along a conveyor axis;
a second integral central linking portion terminating in third and fourth linking ends disposed along said conveyor axis;
a first pair of arms extending outwardly along a first axis transverse to said conveyor axis and being integrally formed with said first linking portion;
a second pair of arms extending outwardly along said first axis and being integrally formed with said second linking portion;
a plurality of spaced ribs attached to only one of said pair of arms of each modular link and being outwardly extending substantially along said conveyor axis in meshed relation, the upper surfaces of said ribs defining a conveyor surface;
said second linking end of said first linking portion being pivotally coupled to said third linking end of said second linking portion for pivotal movement of said first and second linking portions about said first axis;
said first linking end of each of said links being pivotally coupled to said fourth linking end of an adjacent link for pivotal movement about a second axis orthogonal to said conveyor axis and said first axis;
said second and third linking ends each including integral therewith:
a plurality of first spaced planar elements outwardly extending along said conveyor axis, each of said elements of said second linking ends disposed in offset meshed relationship with each of said adjacent elements of said third linking ends to provide pivotal movement about said first axis;
said first and fourth linking ends each including integral therewith:
a plurality of second spaced planar elements outwardly extending along said conveyor axis, each of said second elements of said first linking end of each of said modules disposed in offset meshed relationship with each of said adjacent first elements of said fourth linking end of each of said adjacent modules to provide pivotal movement about said second axis.

23. A bi-directionally movable multiple link conveyor according to claim 11 wherein each modular link includes:
first integral sprocket means on at least one of said first and second link sections at a position intermediate adjacent ones of said second axis extending outwardly from the surface of said sections opposite to said conveyor surface and operative to mesh with a sprocket wheel rotatable about an axis parallel to said conveyor surface;
second integral sprocket means on at least one of said first and second link sections at a position intermediate adjacent ones of said first axis outwardly extending from at least one side of said section in a plane parallel to said conveyor surface and operative to mesh with a sprocket wheel rotatable about an axis orthogonal to said conveyor surface.

* * * * *